United States Patent
Lee et al.

(10) Patent No.: US 8,046,345 B2
(45) Date of Patent: Oct. 25, 2011

(54) METHOD AND SYSTEM FOR MANAGING FILE METADATA TRANSPARENT ABOUT ADDRESS CHANGES OF DATA SERVERS AND MOVEMENTS OF THEIR DISKS

(75) Inventors: Sang-Min Lee, DaeJeon (KR);
Hong-Yeon Kim, DaeJeon (KR);
Young-Kyun Kim, DaeJeon (KR);
Myung-Joon Kim, DaeJeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 507 days.

(21) Appl. No.: 12/177,635

(22) Filed: Jul. 22, 2008

(65) Prior Publication Data
US 2009/0157694 A1 Jun. 18, 2009

(30) Foreign Application Priority Data
Dec. 14, 2007 (KR) ........................ 10-2007-0131119

(51) Int. Cl.
*G06F 7/00* (2006.01)
*G06F 17/30* (2006.01)
(52) U.S. Cl. ........ 707/706; 707/716; 707/770; 709/203; 711/114; 711/170; 711/203
(58) Field of Classification Search .................. 707/706, 707/716, 770; 709/203; 711/114, 170, 203; 714/11
See application file for complete search history.

(56) References Cited

U.S. PATENT DOCUMENTS

| 5,333,315 | A | * | 7/1994 | Saether et al. | 707/E17.01 |
| 5,438,674 | A | * | 8/1995 | Keele et al. | 707/999.202 |
| 6,990,547 | B2 | * | 1/2006 | Ulrich et al. | 709/203 |
| 7,146,524 | B2 | | 12/2006 | Patel et al. | |
| 7,197,598 | B2 | * | 3/2007 | Kim et al. | 711/114 |
| 7,685,126 | B2 | * | 3/2010 | Patel et al. | 707/770 |
| 2002/0032691 | A1 | * | 3/2002 | Rabii et al. | 707/200 |

(Continued)

FOREIGN PATENT DOCUMENTS
WO  WO 02061737 A2 * 8/2002

OTHER PUBLICATIONS

Zhang et al.—"SLAS: An Efficient Approach to Scaling Round-Robin Striped Volumes"—ACM Transactions on Storage, vol. 3, No. 1, Article 3, Mar. 2007 (pp. 1-39).*

(Continued)

*Primary Examiner* — John E Breene
*Assistant Examiner* — Anh Ly
(74) *Attorney, Agent, or Firm* — Staas & Halsey LLP

(57) ABSTRACT

Provided are a method and a system for managing a file metadata, which are independent of a address change of a data server and movements of a disk by using a location of disk where data exists actually as a location information of a file data. The method for managing the file metadata includes determining whether the request of the metadata is valid, verifying information of a disk storing a file data corresponding to the metadata and a data server address in which the file data exists, and transmitting the verified address of the data server to the client. According to the method and the system for managing the file metadata, data services can be continuously provided without modifications of a file metadata even if the data server address is changed.

5 Claims, 6 Drawing Sheets

U.S. PATENT DOCUMENTS

| | | | |
|---|---|---|---|
| 2002/0138559 A1* | 9/2002 | Ulrich et al. | 711/114 |
| 2002/0156840 A1* | 10/2002 | Ulrich et al. | 707/10 |
| 2002/0156974 A1* | 10/2002 | Ulrich et al. | 711/203 |
| 2002/0194523 A1* | 12/2002 | Ulrich et al. | 714/4 |
| 2005/0188248 A1* | 8/2005 | O'Brien et al. | 714/5 |
| 2005/0246397 A1* | 11/2005 | Edwards et al. | 711/114 |
| 2006/0123034 A1* | 6/2006 | Seo et al. | 707/101 |
| 2007/0058933 A1* | 3/2007 | Kobayashi et al. | 386/95 |
| 2007/0174580 A1* | 7/2007 | Shulga | 711/170 |
| 2007/0220021 A1* | 9/2007 | Kato et al. | 707/100 |
| 2008/0270776 A1* | 10/2008 | Totolos et al. | 713/1 |

OTHER PUBLICATIONS

Lee et al.—"Petal: Distributed Virtual Disks"—System research Center, Digital Equipment Corporation, ASPLOS-VII, Proceedings of the seventh International Conference on Architectureal support for Programming Languages and Operating Systems—Oct. 1996, MA, USA (pp. 84-92).*

Sanjay Ghemawat, et al., "The Google File System", *19th ACM Symposium on Operating Systems Principles*, Oct. 2003, Bolton Landing, New York, USA. (15 pages).

* cited by examiner

METHOD AND SYSTEM FOR MANAGING FILE METADATA TRANSPARENT ABOUT ADDRESS CHANGES OF DATA SERVERS AND MOVEMENTS OF THEIR DISKS

CROSS-REFERENCE TO RELATED APPLICATIONS

This application claims priority under 35 U.S.C. §119 to Korean Patent Application No. P2007-131119, filed on Dec. 14, 2007, the disclosure of which is incorporated herein by reference in its entirety.

BACKGROUND OF THE INVENTION

1. Field of the Invention

The present disclosure relates to a method and a system for managing a file metadata to provide a continuous data service in spite of address changes of data server and movements of a disk in a large capacity storage system having an asymmetric structure.

This work was supported by the IT R&D program of MIC/IITA. [2007-S-016-01, A Development of Cost Effective and Large Scale Global Internet Service Solution]

2. Description of the Related Art

The general large-scale storage system requires many data servers, and most of mass storage systems are adopting an asymmetric structure that allows a metadata management server to metadata and allows a data server to data, respectively, in order to guarantee high expansibility of the system.

The metadata management server stores and manages the file metadata, which is location information of a data server storing actual file data.

As illustrated in FIG. 1, the related art asymmetric storage system includes n number of user file systems 100 and 101, a metadata management server 110, and n' number of data servers 120 and 121. The user file systems 100 and 101 request metadata from the metadata management servers 110 and actual file data from the data servers 120 and 121 upon user's request associated with a file. The metadata management server managing the location information of the actual file data checks validity of the request of the user file system, and transmits the requested metadata, e.g., location information of the file data, to the user over network. The data server managing the actual file data hands data of a disk upon the request of such user file systems.

This related art asymmetric storage system stores and manages a data server address by including the location information of the data server in the file metadata. This system has the disadvantage of consuming a lot of time and cost since the administrator must manually change all the data server addresses of the related file metadata with a management tool when the data server address is changed.

When a file metadata is created by using the data server address in an implementation of the related art asymmetric storage system, the data services of all the related files may be interrupted if the data server address is changed due to the address changes in accordance with hardware changes and the change of network topology of the data server, or if a disk is moved from a data server to another data server (e.g., when the administrator intends to provide a data service by using another data server while the data server is shut down for maintenance).

SUMMARY

Therefore, an object of the present invention is to provide a method and a system for managing a file metadata to continuously provide a data service without an intervention of an administrator or administrating tools in spite of address changes of a data server and movements of a disk in a large capacity storage system having an asymmetric structure.

Another object of the present invention is to provide a method and a system for continuously and constantly providing a data service a disk in spite of movement of the disk from a data server to another data server.

To achieve these and other advantages and in accordance with the purpose(s) of the present invention as embodied and broadly described herein, a method for managing a file metadata in accordance with an aspect of the present invention includes: requesting, at a client, metadata from a metadata management server; verifying information of a disk storing file data corresponding to the metadata, to determine a data server address in which the file data exists when the request is valid; and transmitting the verified data server address to the client.

The metadata may include the file metadata, number of data blocks, and a disk identifier that is unique information for each disk existing in the data server.

To achieve these and other advantages and in accordance with the purpose(s) of the present invention, a metadata management server in accordance with another aspect of the present invention includes: a metadata managing means for transmitting metadata corresponding to a client's request to the client; a disk identifier creation means for creating a unique disk identifier corresponding to each disk in a data server; and a disk identifier managing means for creating and updating a disk identifier file including a data server address corresponding each disk identifier.

To achieve these and other advantages and in accordance with the purpose(s) of the present invention, a data server in accordance with another aspect of the present invention includes: a disk identifier issuing means for determining whether a disk identifier of a disk in the data server exists and performing an issuing of the disk identifier; a disk information managing means for periodically verifying all disk information in the data server together with a metadata management server; and a file data managing means for transmitting a corresponding file data at a request of a client.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Hereinafter, specific embodiments will be described in detail with reference to the accompanying drawings.

Figure 1:
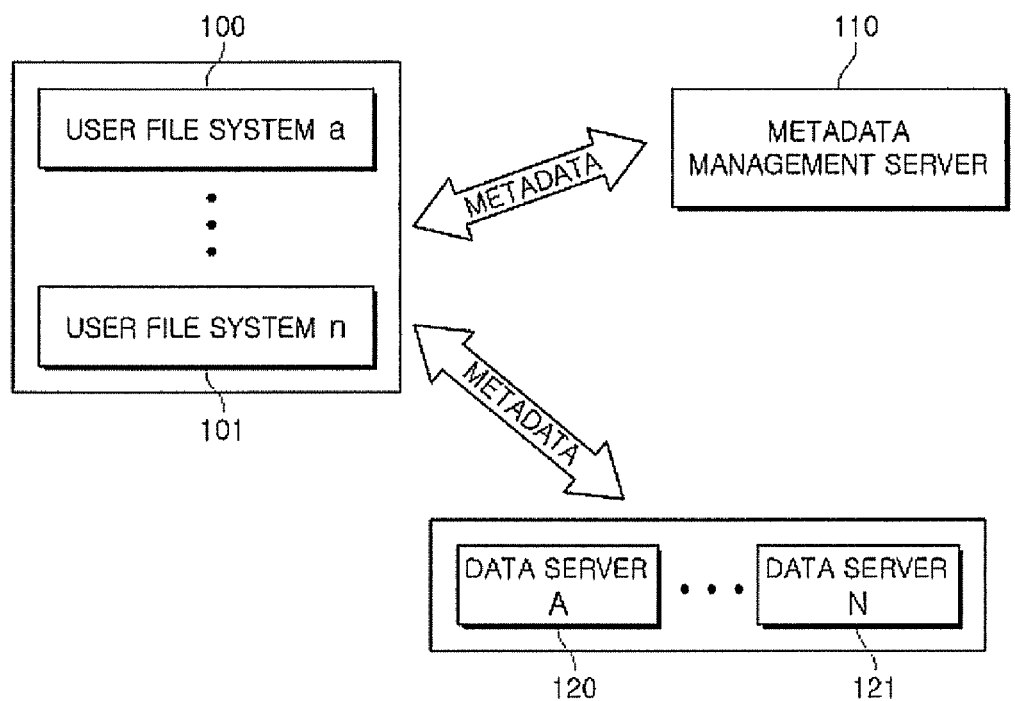
FIG. 1 is a block diagram illustrating a configuration of a related art asymmetric storage system.
Figure 2:
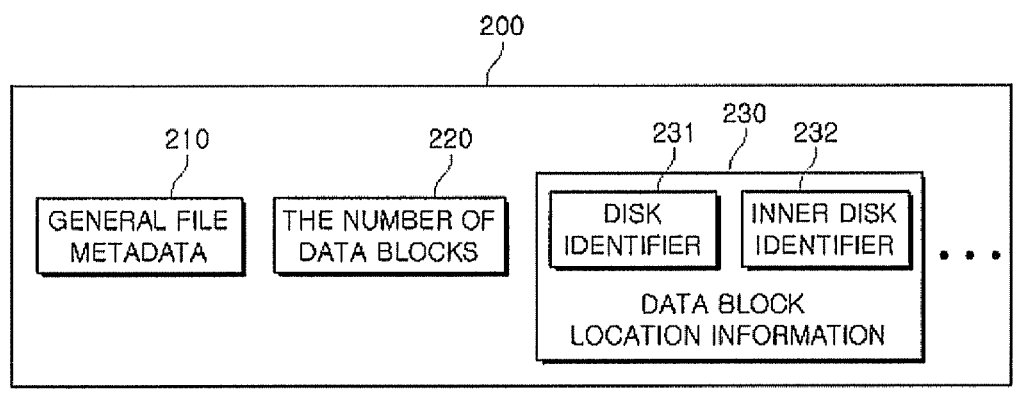
FIG. 2 is a block diagram illustrating a configuration of metadata according to an embodiment of the present invention.

FIG. 2 is a block diagram illustrating the configuration of metadata according to an embodiment of the present invention.

For managing file metadata according to an embodiment of the present invention, the metadata manages location information of file data according to an address of a disk of a data server, not a data server address. Even if the server address is changed, or the disk of the data server is moved, a user can be independently provided with continuous data service.

For this end, the location information of the metadata is maintained and managed in each of disks that exist in all the data servers, which is possible by allocating/managing a disk identifier 231 having a different unique value for each disk.

Referring to FIG. 2, the metadata according to the present invention includes general file metadata 210, e.g., actual file size, access list, etc., the number of data blocks 220 forming file data, and location information 230 of each data block. In this case, the location information 230 of each data block may include a disk identifier 231 and an inner disk identifier 232. The disk identifier 231, as described above, is a unique identifier of each disk existing in the data server, and is permanently stored in each disk.

Figure 3:
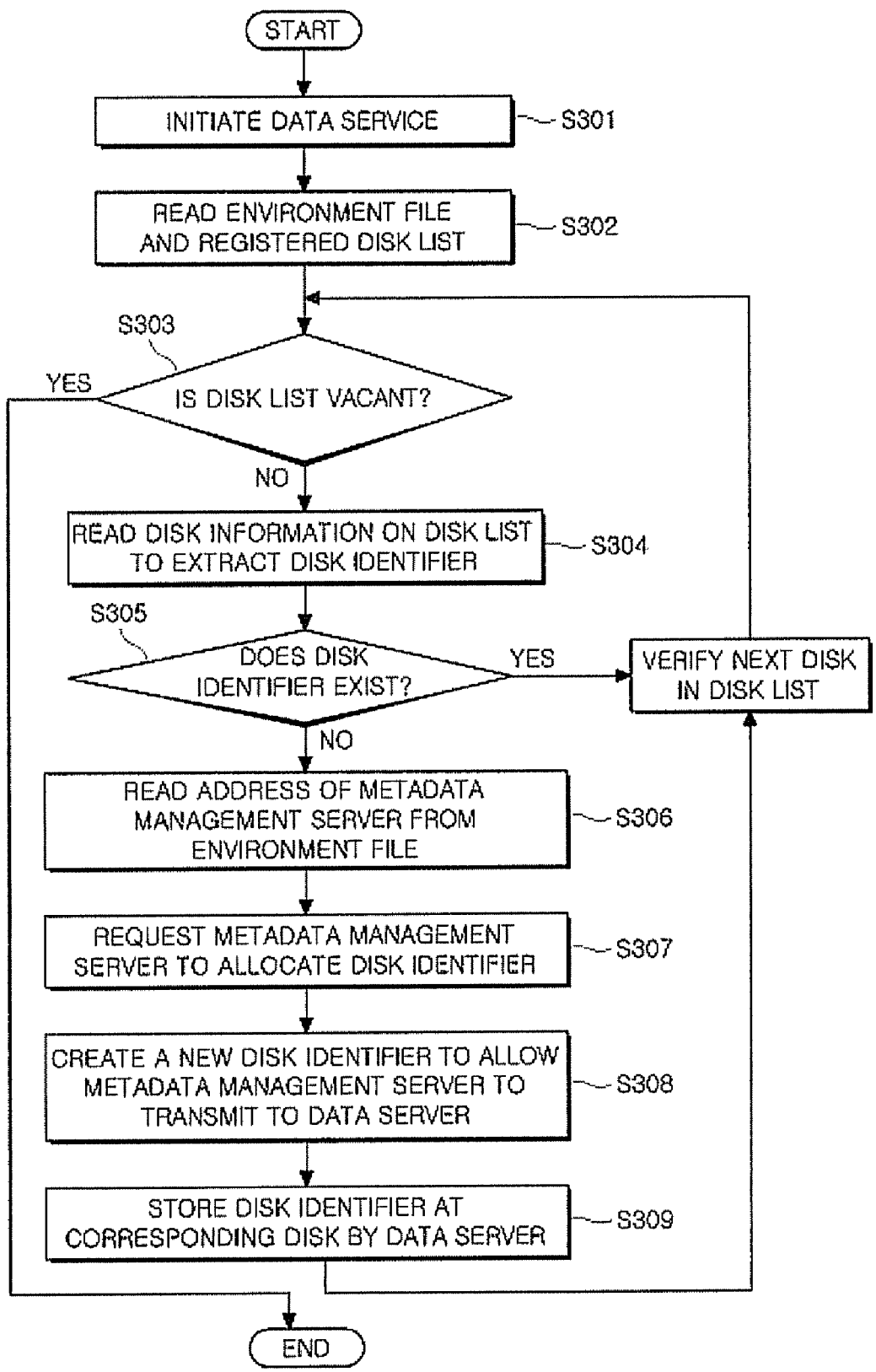
FIG. 3 is a flowchart illustrating a procedure of issuing a disk identifier according to an embodiment of the present invention.

FIG. 3 is a flowchart illustrating a procedure of issuing a disk identifier according to an embodiment of the present invention.

Referring to FIG. 3, if the data server starts providing a data service in operation S301, the data server searches a disk list registered in an environment file in operation S302. In operations S304 and S305, the data server checks if each disk existing in the registered disk list has a disk identifier.

In operation S305, if the disk identifier exists in every disk, this procedure ends. But if the disk identifier does not exist in at least any one disk, the following procedure is performed so that the disk identifier can be allocated in the corresponding disk.

Since creation and allocation of the disk identifier is performed by the metadata server, the data server fetches an address of the metadata management server from an environment file in operation S306, and requests the metadata management server to allocate the disk identifier in operation S307. In operation S308, the metadata management server creates a unique disk identifier, and hands this disk identifier to the data server.

In operation S309, the data server terminates the issuing of the disk identifier by permanently storing the received disk identifier from the data server at the corresponding disk.

Figure 4:
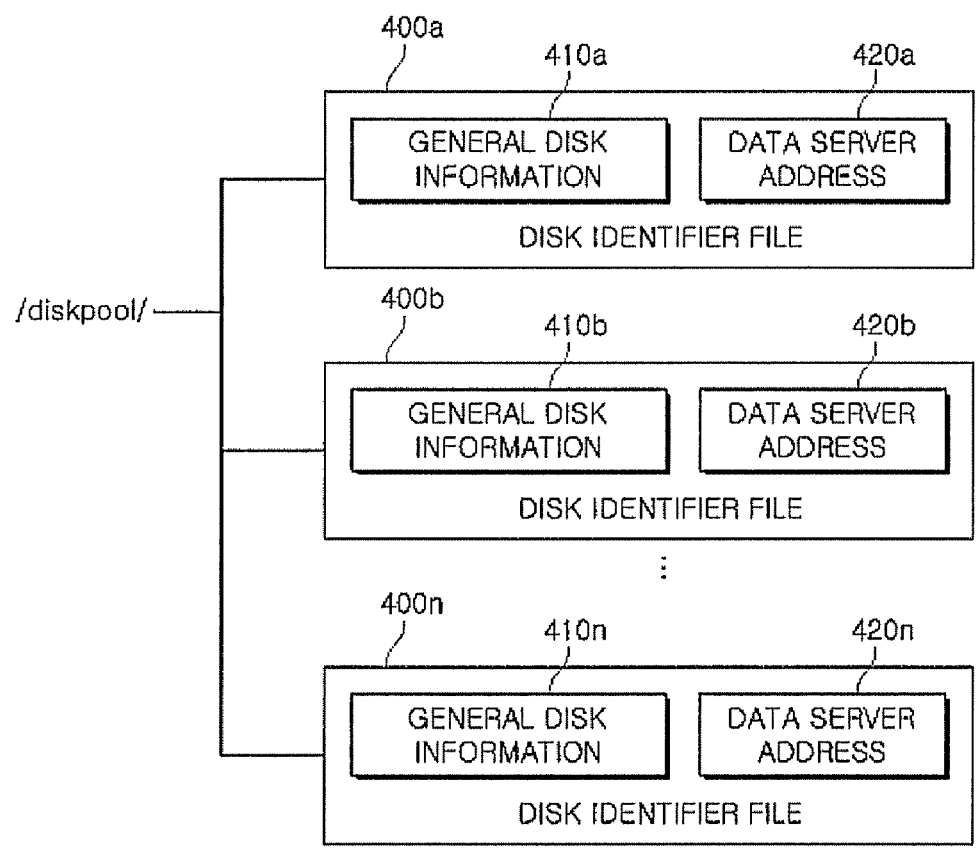
FIG. 4 is a block diagram illustrating a disk identifier file in a metadata management server according to an embodiment of the present invention.

FIG. 4 is a block diagram illustrating a disk identifier file in a metadata management server according to an embodiment of the present invention.

Although the location of the metadata is determined by unit of the disk identifier, it is difficult to request a file data service using a disk identifier by unit of each disk in a user file system of a client requesting the metadata and the file data. Accordingly, the metadata management server requires that disk information (e.g., an address of current data server) of each data server be ensured and managed.

For this end, as illustrated in FIG. 4, the metadata management server maintains a disk identifier file including the address of a data server where disk identifier information, general disk information and the disk exists. The disk identifier file includes the general disk information 410 (e.g., disk state, total disk space, used disk space, etc.), the address 420 of the data server to which the disk presently belongs, and the disk identifier.

The disk identifier files may be collectively managed in a single directory of the metadata management server. Furthermore, file names of the disk identifier files may be used as disk identifiers for higher search efficiency.

As described below, the metadata management server uses disk information of the disk identifier files for searching the disk identifier files on the basis of the disk identifier of the metadata to identify the related disk information and the data server address where the disk exists.

Figure 5:
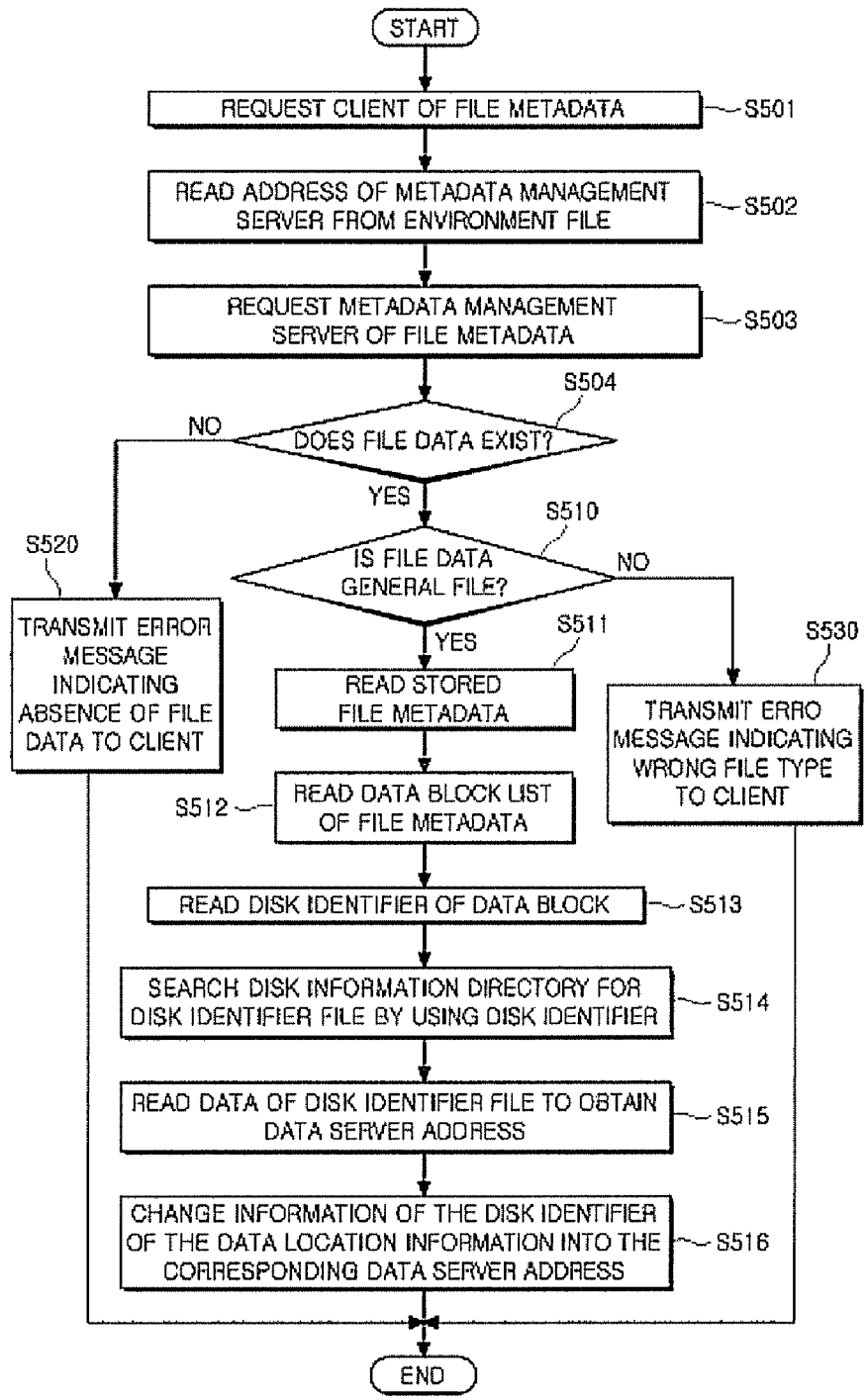
FIG. 5 is a flowchart illustrating a procedure of processing a user's request for metadata according to an embodiment of the present invention.

FIG. 5 is a flowchart illustrating a procedure of processing a user's request for metadata according to an embodiment of the present invention.

Before a user performs services (e.g., file reading/writing) on a file data, a user file system must read out file metadata from the metadata management server. However, since data location information of the file metadata in metadata management server is stored in a disk identifier, a user file system can not know a data server address necessary to a file service request. Accordingly, the metadata management server according to an embodiment of the present invention processes the user's metadata request as illustrated in FIG. 5.

In operation S501, the metadata management server receives the file service request of the user from the user file system. In operation S502, the user file system fetches the address of the metadata management server to be accessed from an environment file. In operation S503, the user file system requests the file metadata from the metadata management server on the basis of the results of operation S502.

In operation S504, the metadata management server having received the request for the file metadata checks if the file data intended to be manipulated by the user exists or not. In operation S520, if the corresponding file does not exist, the metadata management server hands an error code indicating absence of the corresponding file to a client user and terminates this procedure. In operation S510, if the file exists, the metadata management server checks if the file is a general file having the actually corresponding file metadata. In operation S530, if the file is not the general file, the metadata management server hands an error code indicating that the file type is wrong to the client user file system and terminates this procedure.

In operations S511 and S512, if the file metadata request of the client is appropriate, the metadata management server reads the corresponding file metadata 200 and data block location information 230 of the metadata. In operation S513, metadata management server extracts a disk identifier 231 from the data block location information 230.

In order to change the disk identifier information into the data server address, the metadata management server reads a disk identifier file 400 corresponding to the disk identifier in the disk identifier file directory (e.g., /diskpool) in operation S514. In operation S515, the metadata management server finds the data server address 520 of the disk identifier file 400. In operation S516, the metadata management server changes information of the disk identifier 231 of the data location information 230 into the corresponding data server address.

As describe above, the file metadata finally changed into the data server address is handed over to the client user file system, so that the client may fulfill the request of transmitting the file data to the data server.

Figure 6:
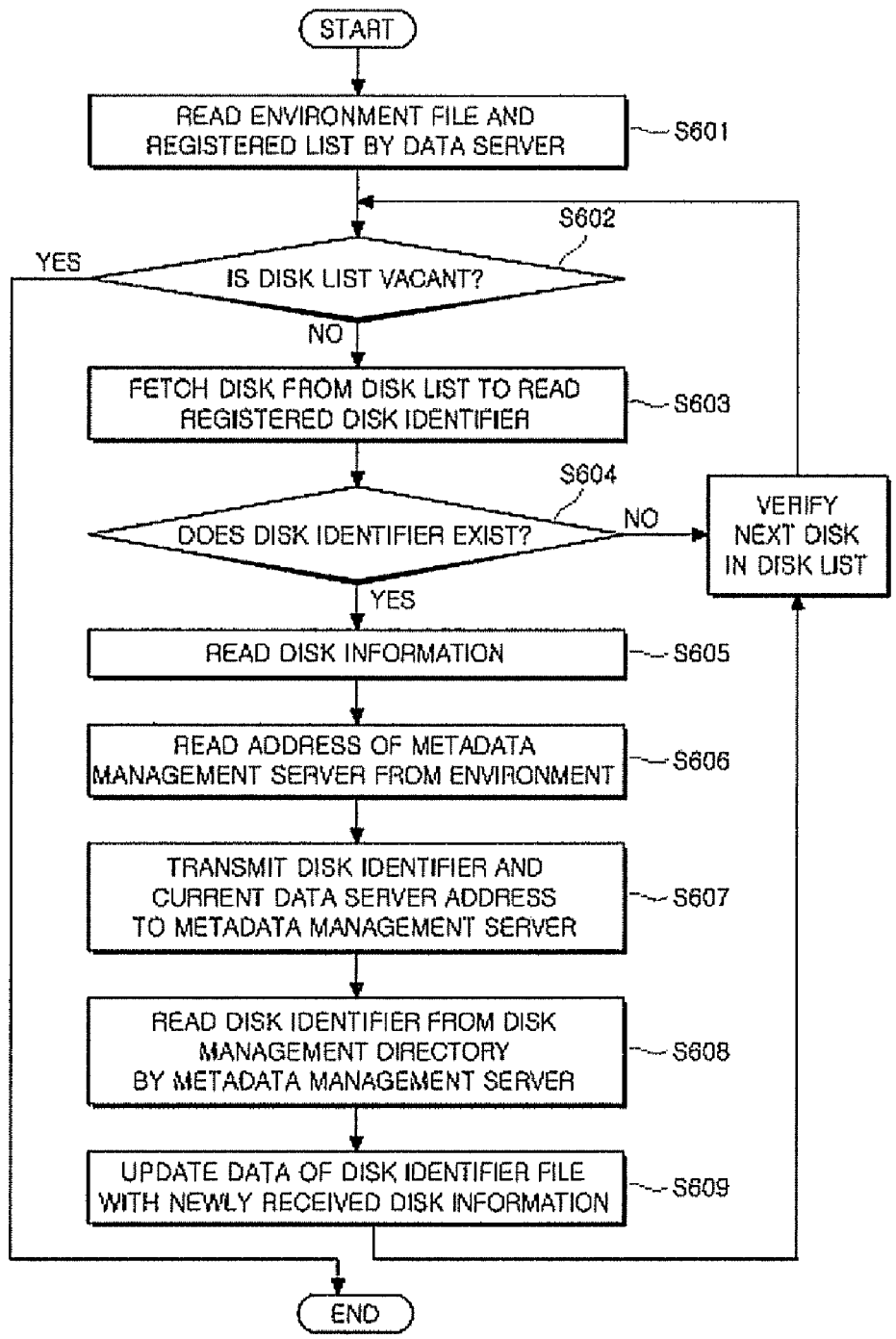
FIG. 6 is a flowchart illustrating a procedure of periodically updating a disk identifier according to an embodiment of the present invention.

FIG. 6 is a flowchart illustrating a procedure of periodically updating a disk identifier according to an embodiment of the present invention.

Referring to FIG. 6, a data server periodically communicates with a metadata management server in order to keep effectiveness of a disk identifier.

In operation of S601, the data server reads an environment file to know an address of a metadata management server and a currently managed disk list. In operation S603, if the disk list exists, the data server selects one disk from the disk list to extract a disk identifier corresponding to the disk.

When the disk identifier has not been extracted in the above procedure, which is a state that the disk list is vacant or a disk identifier needs to be newly issued. Accordingly, the procedure returns to operation S602 to read a next disk of the disk list and then repeat operations S602 through S604.

If the disk identifier is found in above procedure, the data server obtains disk information in operation S605, and brings an address of the metadata management server from the environment file in operation S606 for an updating. In operation S607, the data server transmits the disk identifier, the general disk information and the data server address to the metadata management server on the basis of the metadata server address having brought from the environment file.

In operation S608, the metadata management server reads the disk identifier file 400 from the disk identifier file management directory. In operation S609, the metadata management server performs the update by using the disk information transmitted from the data server.

For the above update, the metadata management server compares the disk information received from the data server with information in the disk identifier file of the metadata management server, thereby determining whether they are the same as each other. That is, the metadata management server checks whether the both data are identical to each other by using the disk identifier. If the data are not identical to each other, the metadata management server updates the general disk information and the data server address in the disk identifier file by using the disk information received from the data server.

According to the present invention, data services can be continuously provided without modifications of the file metadata even if the data server address is changed. Furthermore, the data services can be provided by moving the disk of the data server to another data server even if the data server is shut down for data server maintenance.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for managing file metadata, comprising:
   requesting, at a client, metadata from a metadata management server;
   verifying information of a disk storing file data corresponding to the metadata, and a data server address in which the file data exists when the request is valid; and
   transmitting the verified address of the data server to the client,
   wherein the metadata management server comprises a disk identifier directory comprising one or more disk identifier files each comprising a disk identifier, general disk information, and the data server address where the disk corresponding to the disk identifier exists.

2. The method of claim 1, wherein the general disk information comprises at least one of disk state, total disk space and used disk space.

3. The method of claim 1, wherein the verifying of the data server address comprises:
   searching the disk identifier file in a disk management directory of the metadata management server by using the disk identifier of the metadata; and
   extracting the data server address of the disk identifier file.

4. A metadata management server, comprising:
   a metadata managing means for transmitting metadata corresponding to a client's request to the client;
   a disk identifier creation means for creating a unique disk identifier corresponding to each disk in a data server; and
   a disk identifier managing means for creating and updating a disk identifier file comprising a data server address corresponding each disk identifier,
   wherein the disk identifier managing means receives each disk identifier, general disk information, and a data server address from the data server, checks if the received information is identical to information of a retained disk identifier file, and updates the information of the disk identifier file with the received information when the received information is different from the information of the disk identifier file.

5. A data server comprising:
   a disk identifier issuing means for determining whether a disk identifier of a disk in the data server exists and performing an issuing of the disk identifier;
   a disk information managing means for periodically verifying all disk information in the data server together with a metadata management server; and
   a file data managing means for transmitting a corresponding file data at a request of a client,
   wherein the disk identifier managing means verifies whether the disk identifier in each registered disk list exists at the start of data service, requests the metadata management server to allocate the disk identifier when the disk identifier is absent in any disk, receives the disk identifier allocated by the request, and stores the disk identifier at a corresponding disk.

* * * * *